US010861306B2

(12) United States Patent
Cao et al.

(10) Patent No.: US 10,861,306 B2
(45) Date of Patent: Dec. 8, 2020

(54) METHOD AND APPARATUS FOR VIDEO SURVEILLANCE

(71) Applicant: EMC IP Holding Company LLC, Hopkinton, MA (US)

(72) Inventors: Yu Cao, Beijing (CN); Xiaoyan Guo, Beijing (CN); Zhe Dong, Beijing (CN); Sanping Li, Beijing (CN); Jun Tao, Shanghai (CN); Accela Yilong Zhao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 122 days.

(21) Appl. No.: 15/455,347

(22) Filed: Mar. 10, 2017

(65) Prior Publication Data

US 2017/0263090 A1  Sep. 14, 2017

(30) Foreign Application Priority Data

Mar. 11, 2016  (CN) .......................... 2016 1 0141383

(51) Int. Cl.
| | | |
|---|---|---|
| *G08B 13/196* | (2006.01) | |
| *H04N 7/18* | (2006.01) | |
| *H04L 29/08* | (2006.01) | |
| *G08B 25/01* | (2006.01) | |
| *H04L 29/06* | (2006.01) | |

(52) U.S. Cl.
CPC ... *G08B 13/19673* (2013.01); *G08B 13/1966* (2013.01); *G08B 13/19671* (2013.01); *G08B 25/016* (2013.01); *H04L 65/1073* (2013.01); *H04L 65/4084* (2013.01); *H04L 67/2804* (2013.01); *H04L 67/42* (2013.01); *H04N 7/185* (2013.01)

(58) Field of Classification Search
CPC .......... G08B 13/19673; G08B 13/1966; G08B 13/19671; G08B 25/016; H04W 76/10; H04L 65/1073; H04L 65/4084; H04L 67/2804; H04L 67/42; H04N 7/185
USPC .................................................. 348/158, 143
See application file for complete search history.

(56) References Cited

U.S. PATENT DOCUMENTS

2002/0044690 A1  4/2002  Burgess
2002/0052719 A1*  5/2002  Alexander .............. H04L 41/22
                                                      702/188

(Continued)

FOREIGN PATENT DOCUMENTS

CN      101583024      11/2009
CN      102291434      12/2011

*Primary Examiner* — Matthew K Kwan
(74) *Attorney, Agent, or Firm* — BainwoodHuang (57) ABSTRACT

Embodiments of the present disclosure provide a method and apparatus for video surveillance. The method comprises: receiving a video data transmission request from a mobile device; registering the mobile device as a temporary surveillance device of the video surveillance system in response to the video data transmission request; establishing a wireless connection with the mobile device, receiving video data from the mobile device via the wireless connection; and processing and storing the video data. The methods or apparatuses of the present disclosure enables a mobile device to temporarily join in a video monitoring system as needed so as to supplement and reinforce the existing video monitoring systems, e.g., enhancing the coverage and/or precision of the video surveillance systems.

16 Claims, 10 Drawing Sheets

(56) References Cited

U.S. PATENT DOCUMENTS

| | | | |
|---|---|---|---|
| 2008/0018738 A1 | 1/2008 | Lipton et al. | |
| 2008/0114633 A1 | 5/2008 | Wolf et al. | |
| 2010/0095065 A1* | 4/2010 | Gray | G06F 17/30241 |
| | | | 711/122 |
| 2010/0279670 A1* | 11/2010 | Ghai | H04L 65/1083 |
| | | | 455/414.3 |
| 2011/0242317 A1* | 10/2011 | Wengrovitz | H04N 7/181 |
| | | | 348/143 |
| 2014/0254876 A1 | 9/2014 | Srinivasan et al. | |
| 2014/0375800 A1* | 12/2014 | Lim | H04M 1/72538 |
| | | | 348/143 |

\* cited by examiner

METHOD AND APPARATUS FOR VIDEO SURVEILLANCE

RELATED APPLICATIONS

This application claim priority from Chinese Patent Application Number CN201610141383.3, filed on Mar. 11, 2016 at the State Intellectual Property Office, China, titled "METHOD AND APPARATUS FOR VIDEO SURVEILLANCE" the contents of which is herein incorporated by reference in its entirety.

FIELD

Embodiments of the present disclosure relate to a video surveillance system, and more specifically relate to a method and apparatus for improving a video surveillance system using a mobile device.

BACKGROUND

At present, as a part of efforts for realizing a smart and safe city, video surveillance systems have been commonly deployed to achieve a higher safety, better services (e.g., retail) or a larger capacity (e.g., transportation). Numerous high-resolution IP cameras are deployed in more and more city- or even national-wide video surveillance and monitoring environments.

The existing city-wide central video surveillance systems usually can only monitor and ensure safety within a pre-defined region only using statically mounted surveillance devices (e.g., cameras). It is apparently impractical to mount surveillance cameras at each corner of the whole city, and therefore, there are always blind points in current video surveillance systems. In addition, even at positions covered by cameras, some accidents (e.g., traffic accidents or criminal events) possibly need a larger surveillance range than what can be currently provided, and/or need more details than what can be currently provided. On the other hand, it is uneconomical to mount fixed video surveillance devices at positions that rarely or occasionally need video surveillance and positions that are unpredictable, because utilization of such surveillance devices is very low, and the video streams as generated are useless in most time.

Therefore, a more comprehensive and real-time surveillance is desired so as to be capable of covering broader, more dynamic and more flexible surveillance areas without significantly increasing hardware inputs of the surveillance systems.

Methods and apparatuses are provided in the embodiments of the present disclosure so as to solve at least some of the problems above.

SUMMARY

Embodiments of the present disclosure provide a method and apparatus for a video surveillance system. Summary of various embodiments is provided below so as to provide basic understanding with respect to some aspects of various embodiments. The summary is not intended to identify gist of key elements or describe scope of various embodiments. The only purpose is to present some concepts in a simplified way, as s preamble for subsequent more detailed depiction.

A first aspect of the present disclosure provides a method used in a video surveillance system. The method comprises: receiving a video data transmission request from a mobile device (e.g., via a wireless link); registering the mobile device as a temporary surveillance device of the video surveillance system in response to the video data transmission request; establishing a wireless connection with the mobile device, and receiving video data from the mobile device via the wireless connection; and processing and storing the video data.

In one embodiment, the video monitoring system may also comprise a fixed surveillance device that is included in the video monitoring system for a long term.

In another embodiment, the method may further comprise: prior to receiving the video data transmission request from the mobile device (e.g., via the wireless link), transmitting, to, the mobile device, an indication for joining in the video surveillance system.

In another embodiment, establishing a wireless connection with the mobile device may comprise: assigning a video server for processing the video transmission request; and establishing the wireless connection with the mobile device via the video server.

Optionally, in one embodiment, the method may further comprise: monitoring usage of resources in the video surveillance system; and adjusting, based on the monitoring, resource amount allocated for the video surveillance system.

In another embodiment, the method may also comprise: saving a break point upon interruption of the wireless connection with the mobile device, so as to facilitate recovering the wireless connection from the break point.

In a further embodiment, the method may further comprise: receiving, from the mobile device, a result of pre-processing of the video data via the wireless connection; and processing and storing the video data may comprise processing and storing the video data and the result of pre-processing. In an example embodiment, the result of pre-processing for the video data includes at least one of: a video frame; metadata; and at least one of a type, configuration, and model of the mobile device; capturing time and/or location of the video contained in the video data; and a content feature and/or an object of the video data. In another embodiment, processing and storing the video data and the result of pre-processing comprises: processing and storing the video data and the result of pre-processing, respectively. In a further embodiment, processing and storing the video data and the result of pre-processing, respectively, comprises: performing data staging for the video data, processing and storing the video data that are data staged, and processing and storing the result of pre-processing without data staging.

In one embodiment, the wireless connection is a bi-directional connection, and the method further comprises: providing an alarm via the mobile device to a user via the wireless connection in response to detecting abnormality when processing the video data.

A second aspect of the present disclosure provides a method, used in a mobile device, for video surveillance. The method comprises: transmitting a video data transmission request to a video surveillance system (e.g., via a wireless link); establishing a wireless connection with the video monitoring system as a temporary surveillance device of the video monitoring system, and transmitting video data to the video surveillance system via the wireless connection.

A third aspect of the present disclosure provides an apparatus used in a video surveillance system. The apparatus comprises: a first receiving unit configured to receive a video data transmission request from a mobile device (e.g., via a wireless link); a registering unit configured to register the mobile device as a temporary surveillance device of the video surveillance system in response to the video data transmission request; a connection management unit configured to establish a wireless connection with the mobile device and receive video data from the mobile device via the wireless connection; and a processing and storing unit configured to process and store the video data.

A fourth aspect of the present disclosure provides an apparatus, used in a mobile device, for video surveillance. The apparatus comprises: a first transmitting unit configured to transmit a video data transmission request to a video surveillance system (e.g., via a wireless link); a connection management unit configured to establish a wireless connection with the video monitoring system as a temporary surveillance device of the video monitoring system; and a second transmitting unit configured to transmit video data to the video surveillance system via the wireless connection.

A fifth aspect of the present disclosure provides an apparatus. The apparatus comprises at least one processor, and at least one memory including computer program code, wherein the at least one memory and the computer program code is configured, with the at least one processor, to cause the apparatus to perform the method according to the first aspect of the present disclosure.

A sixth aspect of the present disclosure provides an apparatus. The apparatus comprises at least one processor, and at least one memory including computer program code, wherein the at least one memory and the computer program code is configured, with the at least one processor, to cause the apparatus to perform the method according to the second aspect of the present disclosure.

The methods or apparatuses of the present disclosure can cause a mobile device to join a video monitoring system temporarily as needed, so as to supplement and reinforce the existing video monitoring systems, e.g., enhancing the coverage and/or precision of the video surveillance systems.

Although specific embodiments are illustrated by way of example, in the figures, it should be understood that depictions of the specific embodiments of the present disclosure are not intended to limit the embodiments to the specific forms disclosed.

BRIEF DESCRIPTION OF THE DRAWINGS

The objectives, advantages, and other features of the present disclosure will become more apparent from the disclosure and claims below. Here, non-limitative depictions of specific embodiments are provided, by way of example only, with reference to the drawings, in which:

DETAILED DESCRIPTION OF THE PREFERRED EMBODIMENTS

In the depiction below, many details will be illustrated for illustration purpose. However, a person of normal skill in the art will appreciate that the embodiments of the present disclosure may be implemented without these specific details. Therefore, the present disclosure is not intended to be limited to the illustrated embodiments; but will be assigned the broadest scope consistent with the principle and features described herein.

It should be understood that the terms "first," "second" and the like are only used to distinguish one element from another. In fact, the first element can also be referred to as the second element; and vice versa. In addition, it should also be understood that the terms "include" and "comprise" are only used to illustrate existence of the stated features, elements, functions or components, but do not exclude existence of one or more other features, elements, functions or components.

As mentioned above, due to cost considerations, there are usually problems of blind points and/or precision in a deployment of existing video surveillance systems, which can hardly meet surveillance needs in specific scenarios. In order to improve the existing video surveillance systems, it is proposed in the embodiments of the present disclosure to use an intelligent and mobile device (e.g., smart phones, mobile phone cameras, and electronic data recorders (EDRs)) to expand the existing video surveillance systems. The main idea behind is that intelligent and mobile devices (e.g., smart phones) with high-speed Internet connection are prevalent nowadays and carried by almost everyone for their daily usage, and these crowd-owned mobile devices could connect into the surveillance network and act as edge video sensors in scenarios where additional surveillance capabilities are desirable.

Specifically, in the embodiments of the present disclosure, we propose an intelligent video surveillance solution implemented by using a mobile device, which causes the mobile device, as a mobile video sensor, to be capable of joining the video surveillance network dynamically as needed, thereby realizing a more flexible and real-time video surveillance. In addition, as will be detailed below, solutions in some embodiments of the present disclosure only need a non-intrusive change to traditional video surveillance systems, and thus allow a non-destructive system migration and upgrade.

Compared with traditional video surveillance systems, at least one of the following, additional data sources may exist in a video surveillance system according to embodiments of the present disclosure:

Intelligent Internet of Things (IoT) devices, such, as a mobile phone and a mobile phone camera. These devices will access the surveillance network as needed and transmit real-time video data to the video server.

Alternatively, videos such as an accident scene may be recorded by a mobile device, and then uploaded in batch to the video surveillance network. In this case, the video data from the data source might not be real-time.

Figure 1:
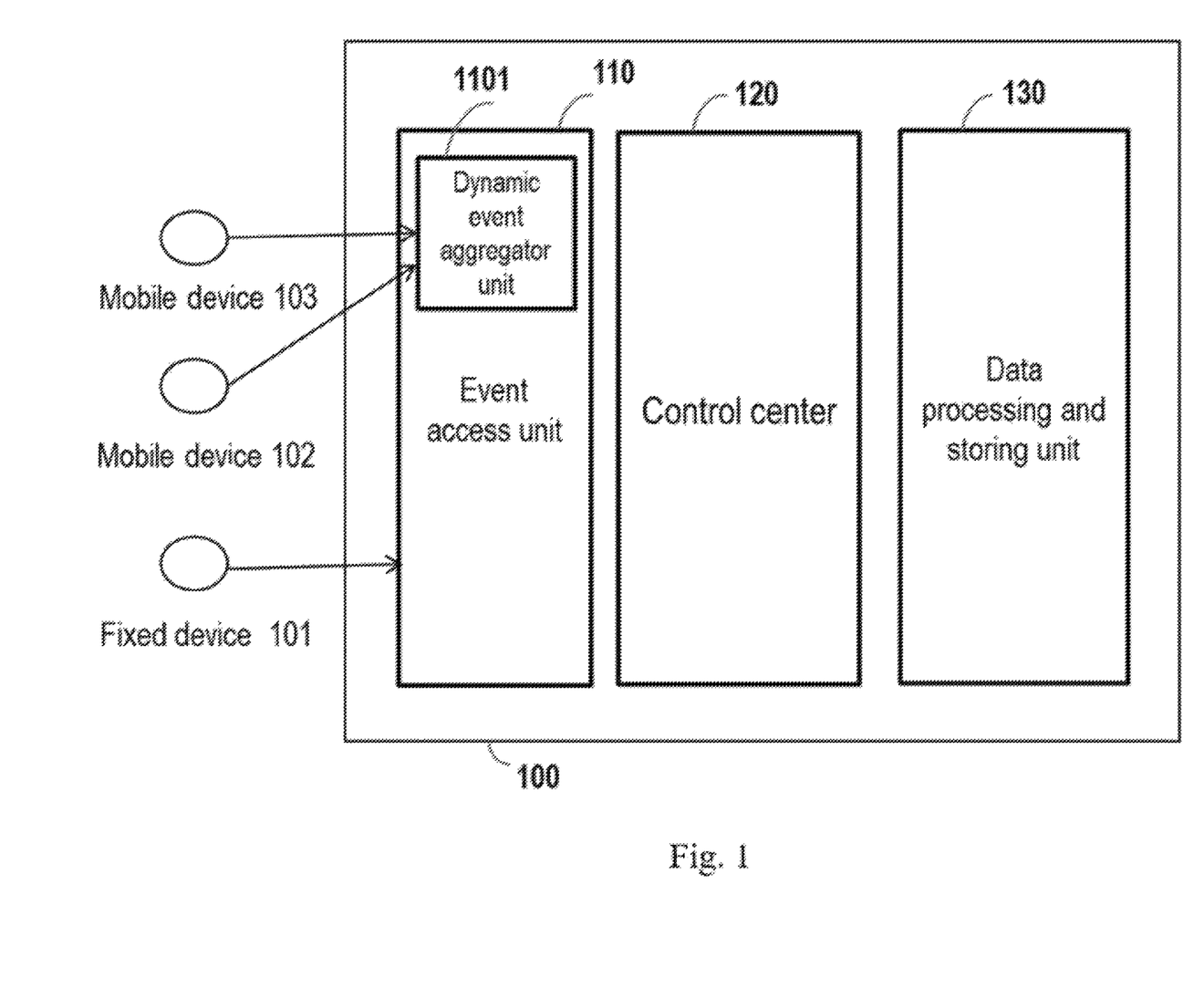
FIG. 1 illustrates an example of a video surveillance system according to the embodiments of the present disclosure.

FIG. 1 illustrates an example of a video surveillance system 100 according to the embodiments of the present disclosure. In this example, the video surveillance system 100 may receive and process data from one or more video surveillance units 101 which are fixedly deployed, and may also receive and process data from one or more mobile devices 102-103 which temporarily join in the system.

In one embodiment, the video surveillance system 100 may comprise an event access unit 110, a control center 120, and a data processing and storing unit 130. Particularly, the event access unit 110, control center 120, data processing and storing unit 130, and one or more fixedly deployed video surveillance units 101 may form an existing video surveillance system. However, in the embodiments of the present disclosure, the mobile device 102 is allowed to join the video surveillance system as needed to expand and improve it. For example, join-in of the mobile device may be enabled by adding a dynamic event aggregator unit 1101 into the event access unit 110.

In another embodiment, a fixedly deployed video surveillance unit 101 may not exist in the video surveillance system, i.e., the video surveillance system in the embodiments of the present disclosure may be formed only by means of mobile devices.

Figure 2A:
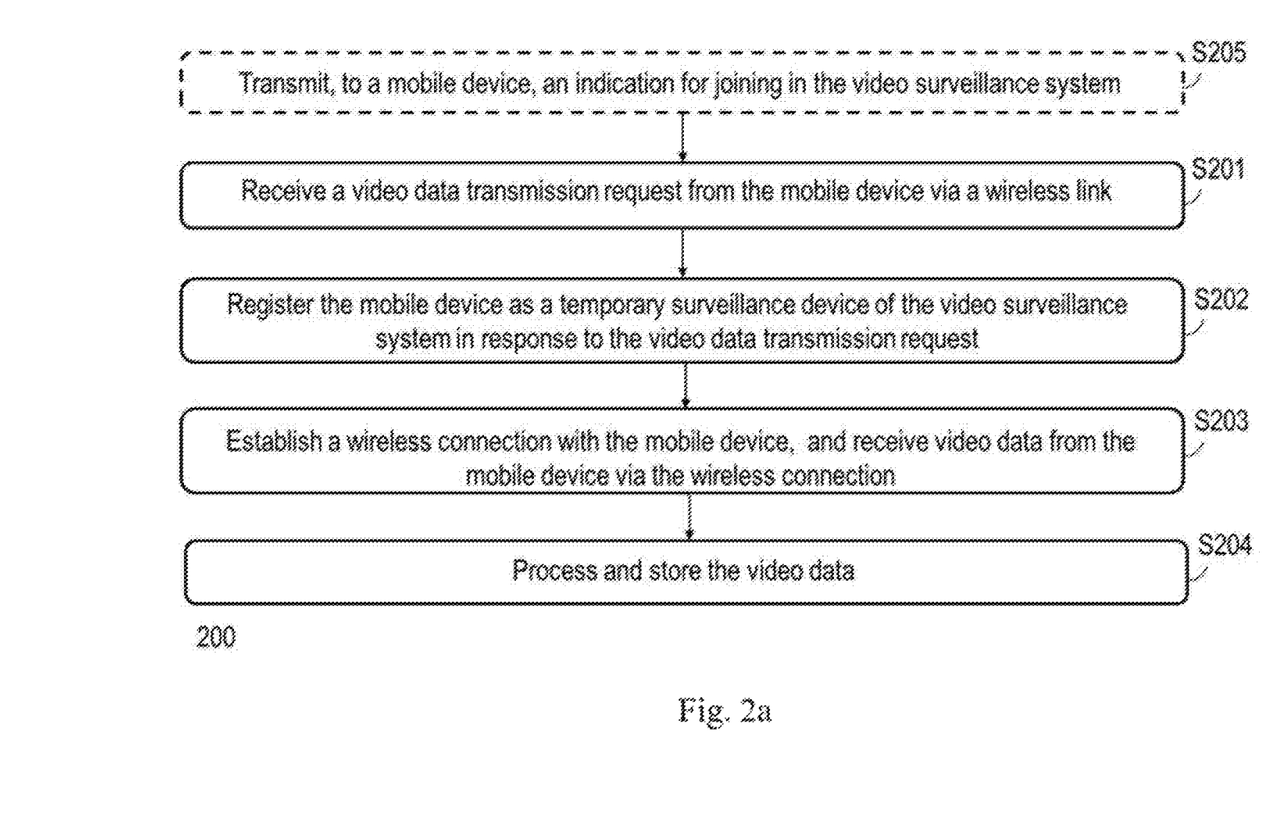
FIGS. 2a-2b illustrate an example flowchart of a method for a video surveillance system according to embodiments of the present disclosure.
Figure 2B:
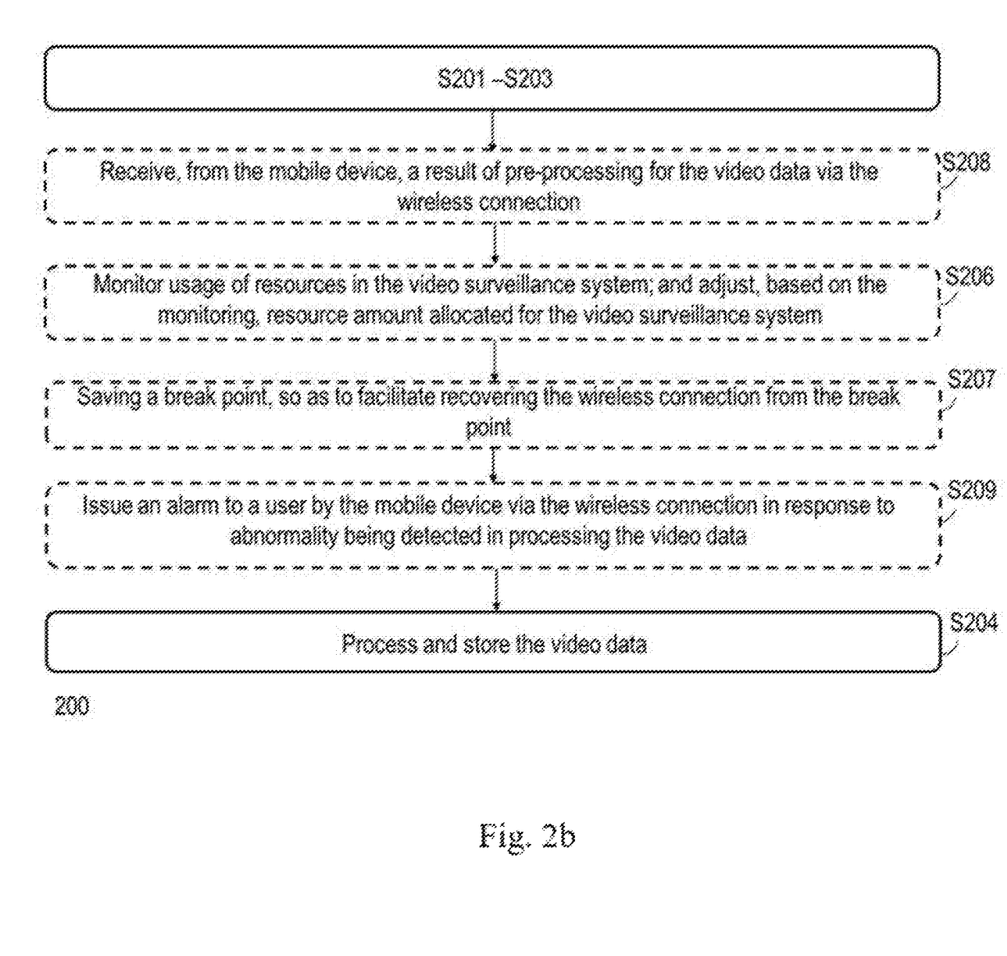

FIGS. 2a-2b illustrate an example flowchart of a method 200 for a video surveillance system. The method may be implemented in the video surveillance system 100 as illustrated in FIG. 1, but is not limited thereto.

As illustrated in FIG. 2a, the method 200 comprises: at block S201, receiving a video data transmission, request from a mobile device (e.g., via a wireless link); at block S202, registering the mobile device as a temporary surveillance device of the video surveillance system in response to the video data transmission request; at block S203, establishing a wireless connection with the mobile device, and receiving video data from the mobile device via the wireless connection; and at block S204, processing and storing the video data.

As mentioned above, the video surveillance system (e.g., the video surveillance system 100) may comprise a fixed surveillance device that joins the video surveillance system in long term. The fixed surveillance device which joins the video surveillance system in long term is, for example, a surveillance device fixedly deployed for a traditional video surveillance system. The fixed surveillance device is usually connected, via a wire, to components in the video surveillance system such as a video server, a controller, and a processor. In this scenario, according to the embodiments of the present disclosure, the mobile device may join in the video surveillance system as needed to expand it.

In another embodiment, the video surveillance system may also be a brand-new video surveillance system, which may not comprise surveillance devices which join the video surveillance system in a long-term or surveillance devices which are fixedly deployed, but only realize the surveillance by collecting video data from a mobile device when needed.

In one example embodiment, the mobile device may voluntarily join in the video surveillance system. Namely, the video data transmission request received at S201 may be voluntarily transmitted by the mobile device. While in another embodiment, the mobile device may join in the video surveillance system upon requirement/invitation. In this embodiment, the method 200 may further comprise a block S205, wherein prior to receiving, e.g., via the wireless link, the video data transmission request from the mobile device, transmitting an indication for joining in the video surveillance system to the mobile device. The indication, for example, may be a requirement/invitation of joining in the video surveillance system. The indication may be broadcast to multiple mobile devices within a certain region or may be transmitted to a specific mobile device.

The registering performed in block S202 may, for example, be performed based on at least part of information in the video data transmission request.

In one embodiment, establishing a wireless connection to the mobile device at block S203 may comprise: assigning a video server for processing the video transmission request; and establishing the wireless connection with the mobile device via the video server. The Connection establishment procedure may be performed according to any appropriate communication protocol and may be implemented through several signaling interactions. Embodiments of the present disclosure have no limitations thereto. For example, at the beginning of the establishing procedure, the video surveillance system may transmit, to the mobile device, a response to the video data transmission request, which may include information for establishing the connection.

Optionally, as illustrated in FIG. 2b, in one embodiment, the method 200 may further comprise block S206, wherein usage of resources in the video surveillance system is monitored; and a resource amount allocated to the video surveillance system is adjusted based on the monitoring. This enables the resources to be exploited more efficiently.

In some embodiments, upon interruption of the wireless connection to the mobile device, the method may save a break point so as to facilitate recovering the wireless connection from the break point, as illustrated in block S207 in FIG. 2.

Alternatively or additionally, in one embodiment, the method 200 may comprise a block S208, wherein a result of pre-processing with respect to the video data is received from the mobile device via the wireless connection; and then the video data and the result of pre-processing are processed and stored at block S204. This enables providing of extra information using the processing capacity of the mobile device, thereby facilitating or simplifying processing of the video surveillance system.

In another embodiment, the result of pre-processing with respect to the video data may comprise at least one of the following: a video frame; metadata; type of the mobile device; configuration of the mobile device; model of the mobile device; capturing time of the video contained in the video data; capturing location of the video contained in the video data; content feature of the video data; and object of the video data.

In one embodiment, at block S204, the video data and the result of pre-processing may be processed and stored, respectively. For example, in one embodiment, the video data and the result, of pre-processing may be individually encoded and modulated before being transmitted, such that in the video surveillance system, different corresponding processing may be applied to them at a receiving side. In another example, data staging (e.g., relaying/buffering) may be performed for the video data, and the video data are processed and stored after the data staging, while the result of pre-processing may be processed and stored directly without the staging. This is based on the consideration that the data amount of the result of pre-processing (e.g., feature and object of the video data) derived by the mobile device is usually not large. Therefore, such result of pre-processing may be directly transmitted to a data processing and storing component (e.g., Gemfire XD and Spark) for processing and analysis, skipping the staging procedure.

In one embodiment, the wireless connection between the video surveillance system and the mobile device as established in block S203 may be a bi-directional connection, and the method 200 may further comprise S209, wherein when abnormality is detected in processing the video data, an alarm may be sent via the mobile device to a user through the wireless connection.

In another embodiment, the method 200 may also comprise an operation of removing the mobile surveillance device from the video surveillance system upon completion of receiving the video data. In another embodiment, it is also allowed to only disconnect the connection with the mobile device while still save at least part of information of the device for future use.

Figure 3:
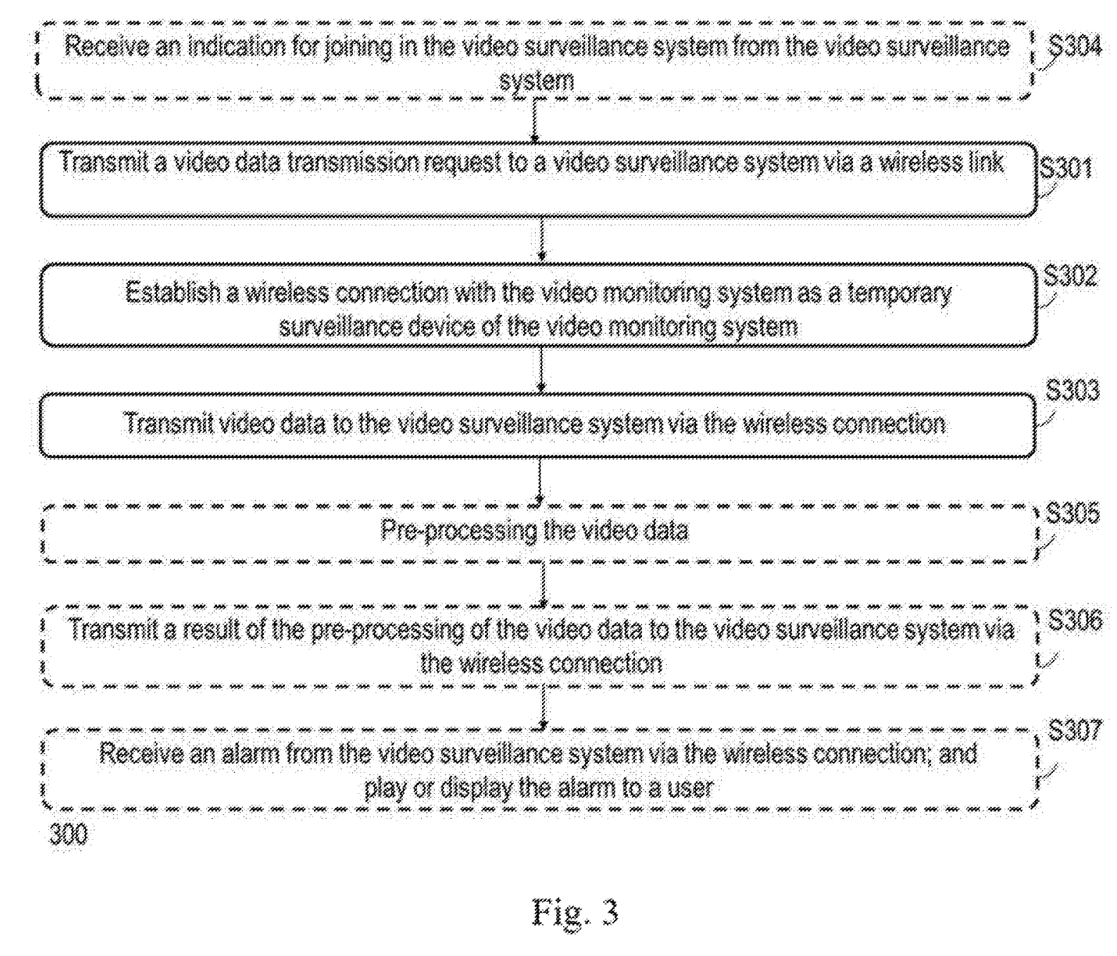
FIG. 3 illustrates an example flowchart of a method, used in a mobile device, for video surveillance according to embodiments of the present disclosure.

FIG. 3 illustrates an example flowchart of a method 300 used in the mobile device. The mobile device can join in the video surveillance system (e.g., system 100 in FIG. 1) according to the embodiments of the present invention for implementing method 200.

As illustrated in FIG. 3, the method 300 comprises: block S301 of transmitting a video data transmission request to a video surveillance system (e.g., via a wireless link); block S302 of establishing, by the mobile device as a temporary surveillance device of the video monitoring system, a wireless connection with the video monitoring system, and block S303 of transmitting video data to the video surveillance system via the wireless connection.

As discussed above in conjunction with method 200, the video surveillance system may also comprise a long-term joined fixed surveillance device.

In one embodiment, the mobile device may voluntarily join in the video surveillance system. In another embodiment, the mobile device may join in the system upon a request/invitation from the video surveillance system. In the embodiment, the method 300 may comprise block S304, in which prior to transmitting (e.g., via the wireless link) the video data transmission request to the video surveillance system, the mobile device receives an indication for joining in the video surveillance system from the video surveillance system.

Optionally, in one embodiment, the mobile device may pre-process the video data using its processing capability at block S305, and at block S306, a result of pre-processing with respect to the video data is transmitted to the video surveillance system via the wireless connection. In one embodiment, the result of pre-processing includes at least one of the following: a video frame; metadata; type of the mobile device; configuration of the mobile device; model of the mobile device; capturing time of the video contained in the video data; capturing location of the video contained in the video data; content feature of the video data; and object of the video data.

In one example embodiment, the wireless connection established at block S302 may be a bi-directional connection, and the method 300 may further comprise block S307 in which the mobile device receives an alarm from the video surveillance system via the wireless connection and broadcasts/displays the alarm to the user.

Hereinafter, a structure of an apparatus 400 used in a video surveillance system may be described with reference to FIG. 4. The video surveillance system may be, but not limited to, the system illustrated in FIG. 1.

The apparatus 400 may perform the method 200 with reference to FIG. 2, but is not limited to performing the method 200. Likewise, the method 200 may be performed by the apparatus 400, but is not limited to being performed by the apparatus 400. For example, at least some operations of the method 200 may be performed by other apparatus.

Figure 4:
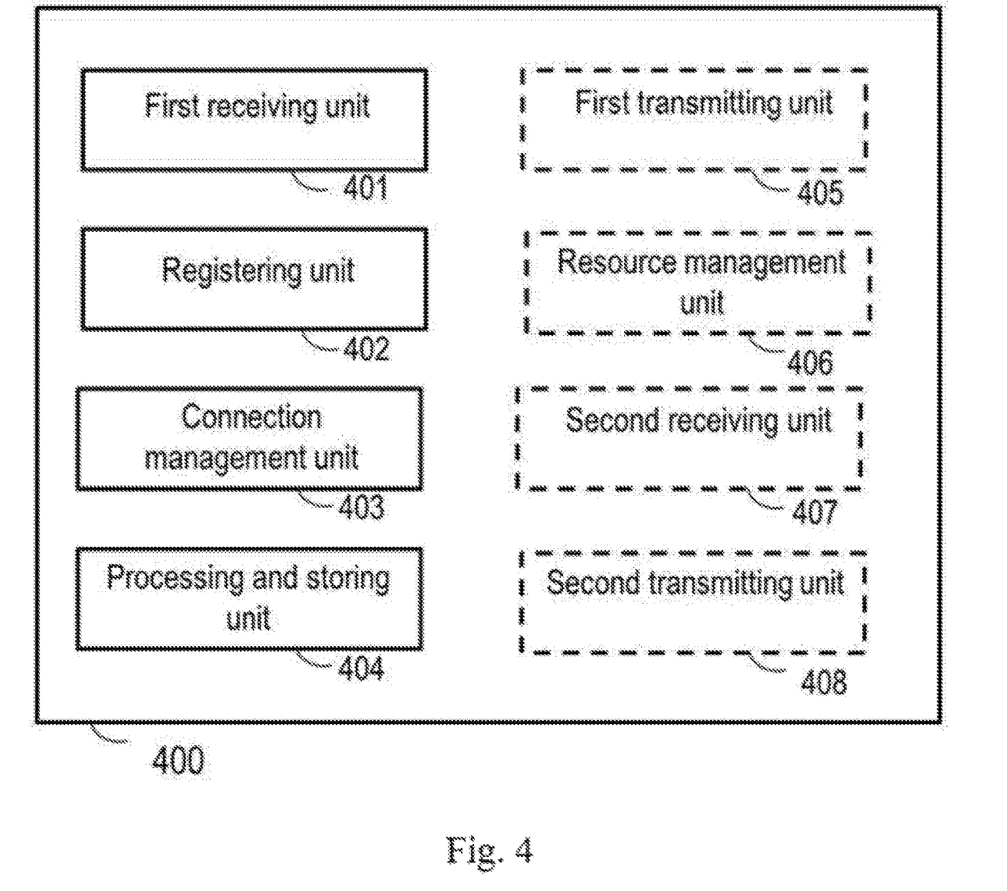
FIG. 4 illustrates a schematic structural diagram of an apparatus used in a video surveillance system according to embodiments of the present disclosure.

As illustrated in FIG. 4, the apparatus 400 comprises: a first receiving unit 401 configured to receive a video data transmission request from a mobile device (e.g., via a wireless link); a registering unit 402 configured to register the mobile device as a temporary surveillance device of the video surveillance system in response to the video data transmission request; a connection management unit 403 configured to establish a wireless connection with the mobile device and receive video data from the mobile device via the wireless connection; and a processing and storing unit 404 configured to process and store the video data.

As discussed above in conjunction with FIG. 1, FIG. 2 and method 200, the video surveillance system may also (but not compulsorily) include a long-term joined fixed surveillance device.

The mobile device may join in the video surveillance system voluntarily or upon a request. Therefore, in one embodiment, the apparatus 400 may further comprise a first transmitting unit 405 configured to transmit an indication for joining in the video surveillance system to the mobile device, prior to receiving (e.g, via the wireless link) the video data transmission request from the mobile device. The indication may be, but not limited to, a request/invitation/command, etc.

In one embodiment, the connection management unit 403 may be further configured to establish a wireless connection with the mobile device through the following operations: assigning a video server for processing the video transmission request; and establishing the wireless connection with the mobile device via the video server.

Alternatively or additionally, in one embodiment, the connection management unit 403 may be further configured to: save a break point upon interruption of the wireless connection with the mobile device, so as to facilitate recovering the wireless connection from the break point.

As illustrated in FIG. 4, optionally, in one embodiment, the apparatus 400 may further comprise a resource management unit 406 configured to: monitor usage of resources in the video surveillance system; and adjust an amount of resource allocated to the video surveillance system based on the monitoring.

In one embodiment, the apparatus 400 may further comprise a second receiving unit 407 configured to receive a result of pre-processing with respect to the video data from the mobile device via the wireless connection; and in this embodiment, the processing and storing unit 404 may be further configured to: process and store the video data and the result of pre-processing. In another embodiment, the result of pre-processing with respect to the video data includes at least one of the following: video frame; metadata; type of the mobile device; configuration of the mobile device; model of the mobile device; capturing time of the video contained in the video data; location of the video contained in the video data; content features of the video data; and objects of the video data.

In one embodiment, the processing and storing unit 404 may be configured to process and store the video data and the result of pre-processing, respectively. For example, the processing and storing unit 404 may perform data staging of the video data, and process and store the video data after the data staging, while the result of pre-processing is directly processed and stored without staging. In another embodiment, the processing and storing unit 404 may be configured to perform a joint processing and storage for the video data and the result of pre-processing.

In another embodiment, the wireless connection established by the connection management unit 403 may be a bi-directional connection, and the apparatus 400 may further comprise a second transmitting unit 408 configured to send an alarm via the mobile device to a user over the wireless connection, when abnormality is detected in processing the video data.

Figure 5A:
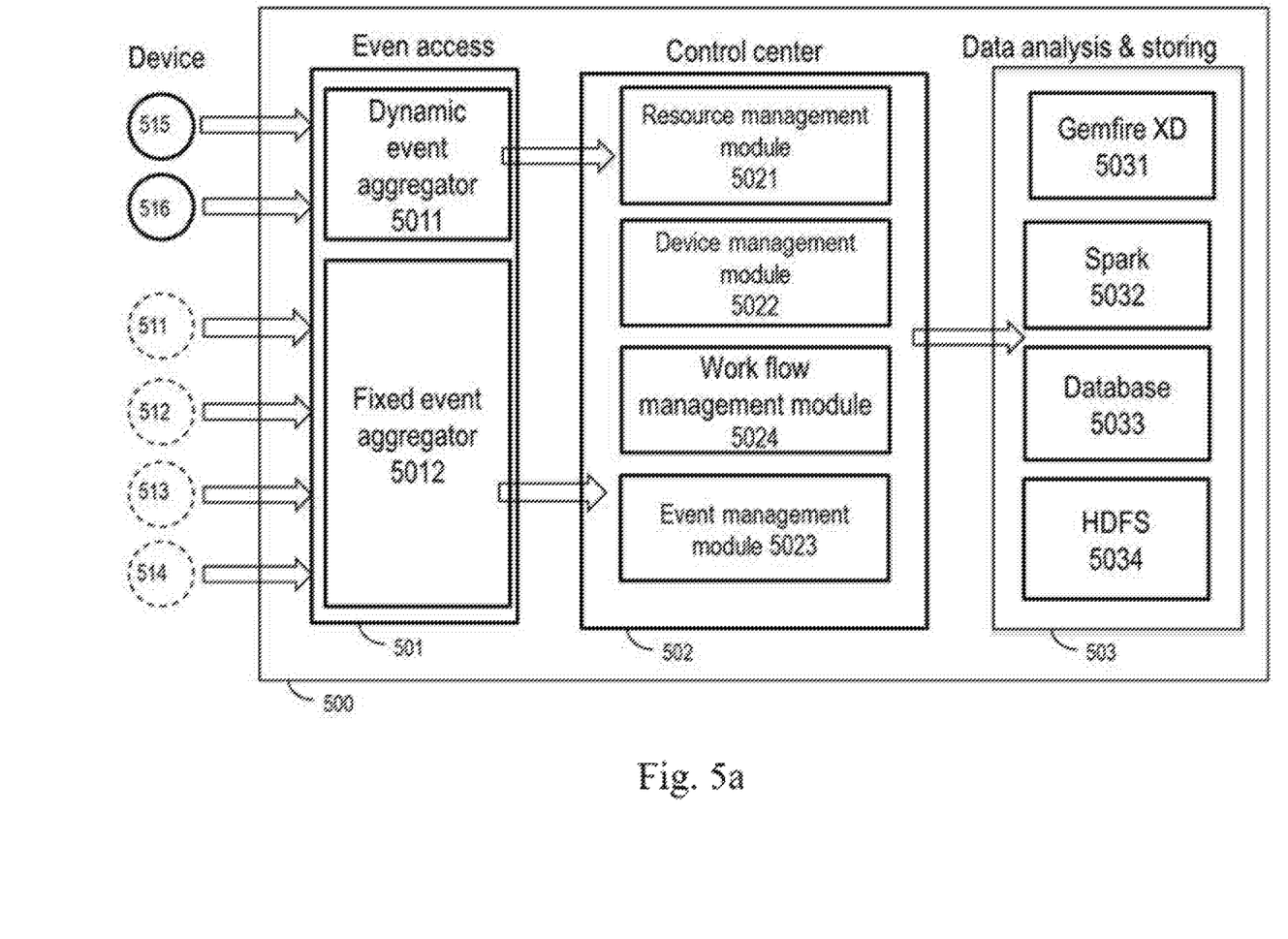
FIGS. 5a-5c illustrate a schematic diagram of a structure and application of another apparatus used in a video surveillance system according to embodiments of the present disclosure.
Figure 5B:
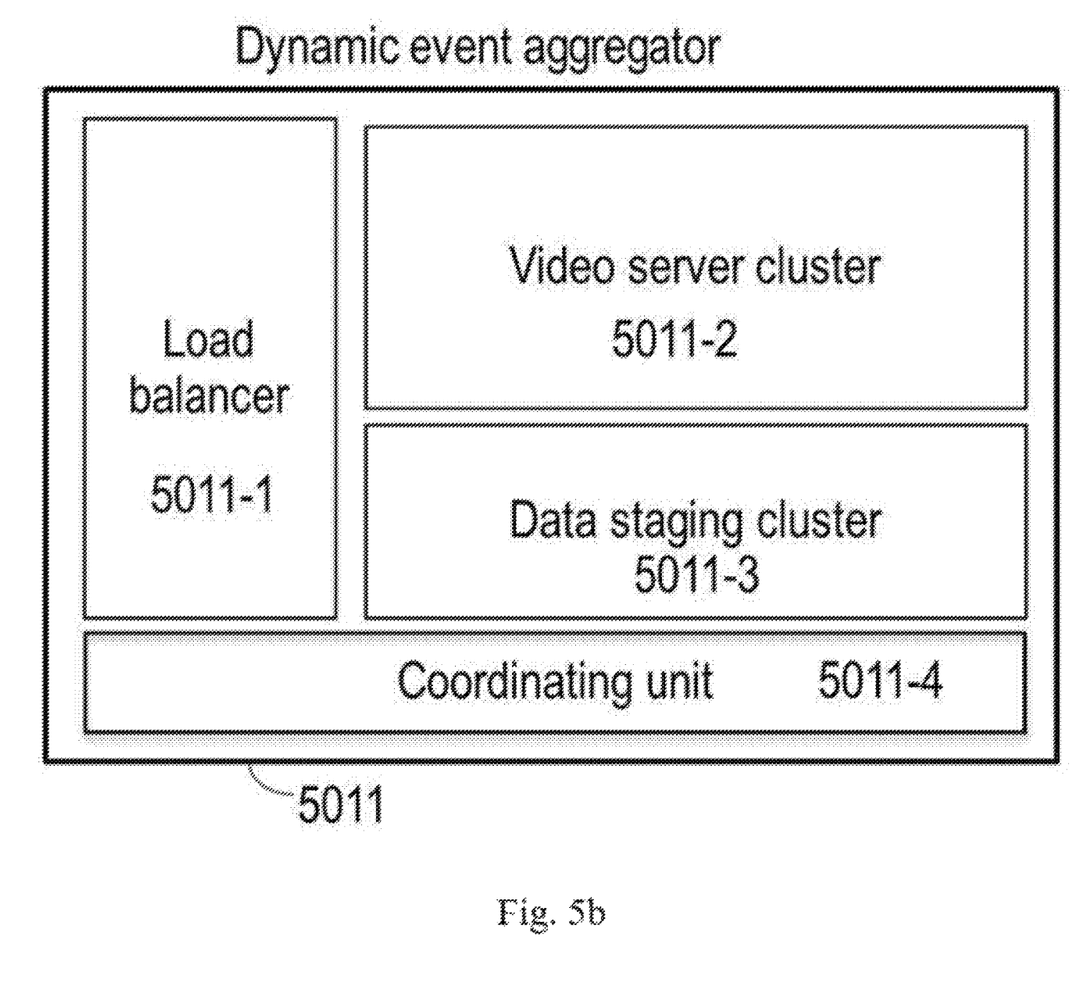
Figure 5C:
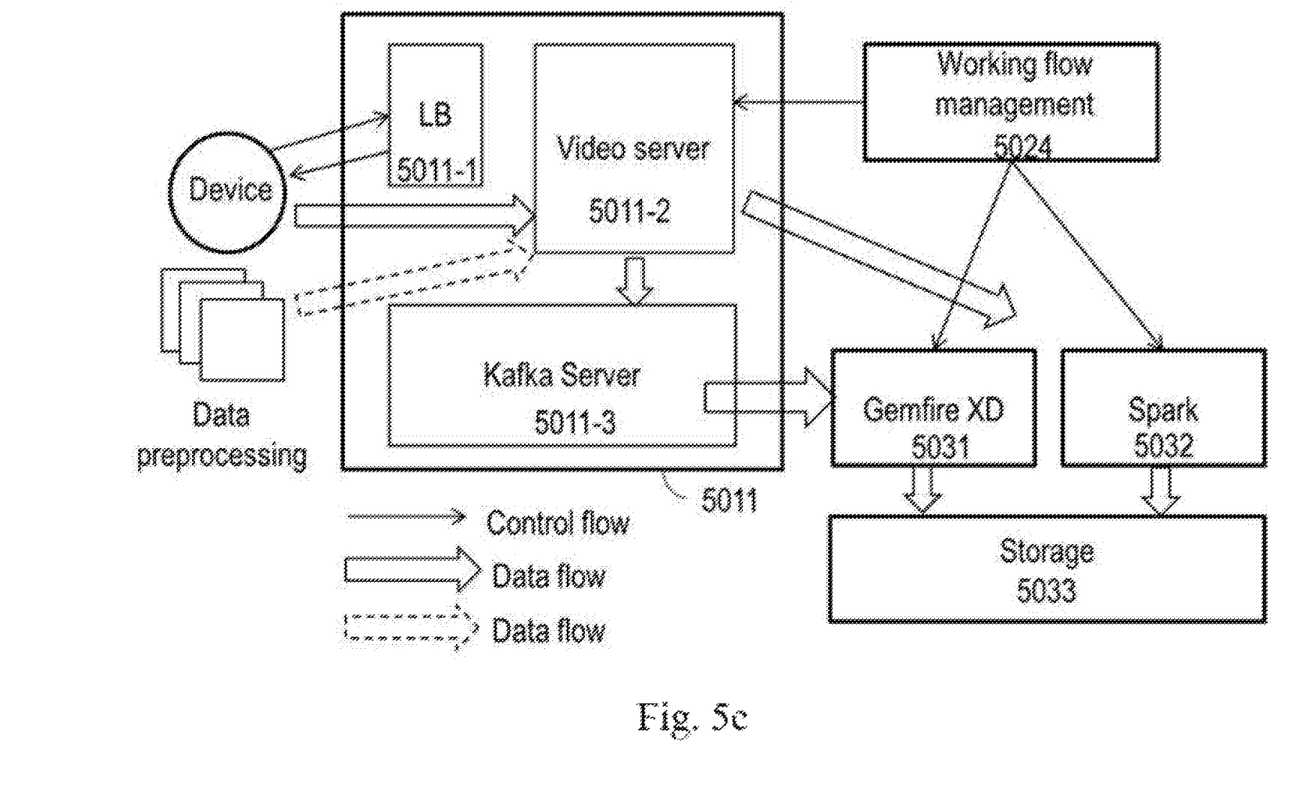

FIGS. 5a-5c illustrate a schematic diagram of a structure and application of another apparatus used in a video surveillance system according to embodiments of the present disclosure. FIG. 5a illustrates a schematic structure of the apparatus 500 and its interaction with fixed devices and mobile devices. As illustrated in the figure, the apparatus may support two kinds of video data sources: traditional fixed surveillance devices represented by dotted-line circles 511-514, and intelligent mobile devices represented by solid-line circles 515-516. Video data from an edge device to a central system are first processed by an event access layer 501, which layer includes two event aggregators (or referred to as event hubs), i.e., dynamic event aggregator 5011 and fixed event aggregator 5012, to process the video data from the fixed device to the mobile device, respectively. Implementation of the fixed event aggregator 5012 for example may be identical to that of the traditional surveillance system.

The control center 502 is a core control module in the apparatus 500, and may be divided into 4 sub-modules as illustrated in FIG. 5a, wherein the resource management module 5021 is responsible for managing at least part of resources in the management system. For example, it may manage resources except those required by the video server and the load balancer. In one embodiment, it may not be responsible for resource management of the data analysis and storing module. In on embodiment, when the current load balance resource or the server resource is insufficient to meet the needs, the resource management module 5021 will trigger idle resources to be used. Alternatively or additionally, in another embodiment, when detecting existence of a large number of idle resources, the resource management module 5021 may reclaim these resources.

In one embodiment, the resource management module 5021 may implement functions identical to those of the resource management unit 406 of the apparatus 400.

The device management module 5022 in FIG. 5a manages and monitors all devices. To enable a device to loin in the surveillance network, the device should be first registered in the device management module. The event management module 5023 functions like a listener, which monitors events of all types, such as join-in of a new device, exit of a device, device interruption, and device recovery. The event management module 5023 works together with the device management module 5022 to process changes of various devices within the surveillance system. For example, when the event management module 5023 monitors join-in of a new mobile device, it may trigger the device management module 5022 to register the device. Or, when the event management module 5023 monitors exit of the mobile device, it may trigger the device management module 5022 to delete the device.

In one embodiment, the event management module 5023 and the device management module 5022 at least partly perform functions of the registering unit 402 of the apparatus 400.

A work flow management module 5024 in FIG. 5a is responsible for connecting all modules, including modules involved in the procedure from data access to data analysis and then to data storage.

The data analysis and storage module 503 of the apparatus 500 as illustrated in FIG. 5a may be implemented in different way dependent on different requirements. In one embodiment, it may adopt currently mature technologies, such as Gemfire XD (5031) and Spark (5032) for data processing, and/or utilize a database (5033) or a distributed file system (HDFS, 5034) for data storage. In another embodiment, it may also adopt newly developed or novel technologies for data processing and/or storage. Embodiments of the present disclosure are not limited to any specific implementations.

FIG. 5b illustrates a schematic structure of the dynamic event aggregator 5011 in FIG. 5a. As illustrated in the figure, it mainly comprises a load balancer 5011-1, a video server cluster 5011-2, a data staging cluster 5011-3, and a coordinating unit 5011-4.

The load balancer 5011-1 is responsible for receiving a user's connection request and assigning an available video server instance to process the request. In one embodiment, it may perform at least part of operations of the first receiving unit 401 and the connection management unit 403 of the apparatus 400 described with reference to FIG. 4.

In one embodiment, when the number of requests for video data transmission increases quickly in a short time, the load balancer 5011-1 will apply for more resources from the control center 502. After the peak value, the control center 502 may reclaim the resources. This flexible resource allocation is advantageous, because the number of mobile devices connected to the network varies dynamically. In this embodiment, the load balancer and the control center together perform at least part of functions of the resource management unit 406 of the apparatus 400.

The video server in the video server cluster 5011-2 may be assigned to process a connection request from the device and keeps the connection being not interrupted. Because most of intelligent mobile devices work in a wireless condition, quality of its connection can hardly be guaranteed. Therefore, the video server may maintain each break point to facilitate future recovery of the connection. In this example, at least part of functions of the resource management unit 406 of the apparatus 400 may be implemented in the video server cluster 5011-2.

After obtaining the video data, the video server cluster 5011-2 has two options. One is to send the data to a backend storage, and the other is to store it into the data staging cluster 5011-3 (e.g. Kafka) for data relay so as to perform real-time video analysis.

In one embodiment, the coordinating unit 5011-4 may be similar to Zookeeper, responsible for coordination between all modules. For example, it may be responsible for delivering, between respective modules, information required by corresponding operation, or synchronizing the information.

In FIG. 5c, a schematic diagram of an operation flow between modules in the apparatus 500 is presented. As illustrated in the figure, the request for video data transmission, video data, and pre-processed data, etc. from the mobile device are accessed by the dynamic event aggregator 5011, controlled by the work flow management module 5024, and analyzed and stored by the data analysis and storage module 503.

In the example illustrated in FIG. 5c, a load balance (LB) in the dynamic event aggregator 5011 will first receive a request from the device, and then may response with an available video server instance. If there is no available video server instance, it may request a resource from the resource management module 5021 as illustrated from FIG. 5a. In one example, if the request for resource fails, an error code may be returned. After obtaining the available video server instance, a bi-directional connection for video transmission is established through the video server 5011-2 with the mobile device. The apparatus 500 may receive video data through the connection. The video server may place the data in the Kafka server for the real-time analysis. The Kafka server is an example of the data staging cluster 5011-3 in FIG. 5b. Gemfire XD and Spark, for example, may be used to perform the real-time analysis of the video data and store the result in the storage system. The working flow management 5024 is responsible for interaction and scheduling between various modules.

As illustrated in FIG. 5c, the apparatus 501) may also receive, through the bi-directional connection 505, an analysis result (e.g., feature and object) derived by the mobile device. The analysis result can skip the data staging phase and is directly transmitted to the Gemfire XD and Spark for processing and analysis. This is because the analysis result generally is not large in size.

Figure 6:
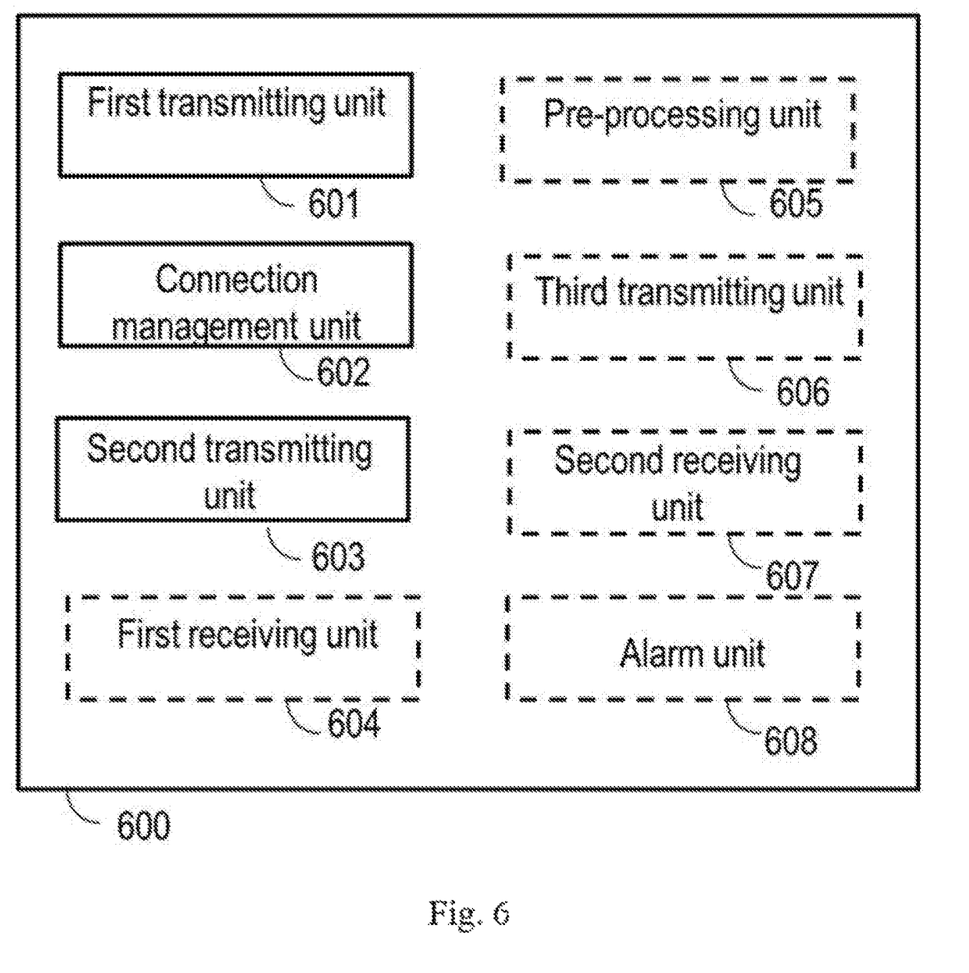
FIG. 6 illustrates a structural diagram of an apparatus, used in a mobile device, for video surveillance.

FIG. 6 illustrates a structural schematic diagram of the application 600 used in a mobile device for video surveillance. According to the embodiments of the present disclosure, the mobile device can temporarily join in the video surveillance system so as to expand it. In one embodiment, the video surveillance system may also comprise a long-term joined fixed surveillance device.

In one embodiment, the apparatus 600 may perform the method 300 described with reference to FIG. 3, but is not limited to performing the method 300. Likewise, the method 300 may be performed by the apparatus 300, but is not limited to being performed by the apparatus 300. For example, at least some operations of the method 300 may be performed by other apparatus.

As illustrated in FIG. 6, the apparatus 600 comprises a first transmitting unit 601 configured to transmit a request for video data transmission to a video surveillance system (e.g., via a wireless link); a connection management unit 602 configured to establish a wireless connection with the video monitoring system as a temporary surveillance device of the video monitoring system; and a second transmitting unit 603 configured to transmit video data to the video surveillance system via the wireless connection.

In one embodiment, the mobile device applies for joining in the system based on a request from the video monitoring system. In the embodiment, the apparatus 600 may further comprise a first receiving unit 604 configured to receive an indication for joining in the video surveillance system from the video surveillance system, prior to transmitting (e.g., via the wireless link) the request for video data transmission to the video surveillance system.

Alternately or additionally, in another embodiment, the apparatus 600 may comprise a pre-processing unit 605 configured to pre-process the video data, and a third transmitting unit 606 configured to transmit the pre-processed result of the video data to the video surveillance system via the wireless connection. A smart mobile device usually has a large or even strong computation capacity. The embodiment of the present disclosure can exploit this capacity. For example, a proxy may be installed in a smart mobile device to implement the function of the pre-processing unit 605. The proxy may be responsible for processing or analyzing the video before the video data is transmitted. The proxy may be embodied as an application in a smart phone, and/or for other devices like EDR, it may be daemon or applet dependent on different application systems.

Examples of the pre-processed results of the video data have been listed above in conjunction with methods 200 and 300, which will not be detailed here.

It should be noted that in one embodiment, the wireless connection established through the connection management unit 602 may be a bi-directional connection, and the apparatus 600 may further comprise a second receiving unit 607 configured to receive an alarm from the video surveillance system via the wireless connection; and an alarm unit 608 configured to broadcast/display the alarm to a user, e.g., emitting a ring tone, displaying a flash, or playing an audio, etc.

Although mature personal house security systems are available currently and commercial solutions have been proposed, they are not suitable for a temporary security surveillance requirement. For example, when camping in the wild, we are always worried about strangers or beasts entering into our camps. However, for a short-term (e.g., 3 days) dwelling, it is impossible to deploy the current house security systems. In this case, according to the method/apparatus of the present embodiment, a mobile device may be used to form a part of the video surveillance system for monitoring the camp. Video data of these mobile devices may be linked to the server side for further analysis; and the server may provide an alarm via the mobile device when detecting an abnormality, e.g., as described in conjunction with block S209 of the method 200 and the alarming unit 608 of the apparatus 600.

Alternatively, or in addition, the methods/apparatuses according to the embodiments of the present disclosure may also be applied to other scenarios. For example, when an emergent accident happens, by virtue of the methods 200-300 according to the embodiments of the present disclosure, citizens may be called to use their mobile phones to transfer field videos to help the investigation of the police. In actuality, even in a large city, the video surveillance devices are still not sufficient and powerful enough to cover road networks; in addition, the angles of cameras in a traffic TV program are not ideal. Therefore, it always occurs that accidents are not shot clearly. In this case, it will be helpful to use a mobile device like a smart phone and an EDR.

In another example, the methods/apparatuses according to embodiments of the present disclosure can facilitate providing of more real-time information. For example, with real-time traffic information in a map application, a most effective routing to the destination can be located. However, the current real-time traffic information is not a truly "real-time," but hysteretic. Fixed cameras are helpful, but their coverage is insufficient, especially on bypaths. Therefore, by virtue of the method according to embodiments of the present disclosure, video data of smart phones and EDRs can be added to the video surveillance system so as to obtain true "real-time" traffic information and a larger coverage.

As can be understood by those skilled in the art, the apparatuses 400-600 may also comprise other units not shown in FIGS. 4-6; and/or in some embodiments, some units in FIGS. 4-6 may be omitted.

In addition, those skilled in the will easily appreciate that the blocks or steps in various methods above may be executed through a programming computer. In the present disclosure, some embodiments are also intended to cover a computer program including instructions which, when being executed in at least one processor, cause the at least one processor to perform any of method 200 or method 300. In the present disclosure, some embodiments are also intended to cover a program storage system, e.g., a digital data storage medium, which is a machine or computer-readable, and encoding machine-executable or computer-executable instruction program, wherein the instruction performs some or all steps of the method 200 or 300. The program storage system may be, e.g., a digital memory, a magnetic storage medium such as a magnetic disk and a magnetic tape, a hardware driver, or an optical readable digital data storage medium. The embodiment is also intended to cover a computer programmed to execute the steps of the methods above. Some embodiments are also intended to cover an apparatus that comprises at least one processor; and at least one memory including a computer program code, wherein the at least one memory and the computer program code are configured to: together with the at least one processor, cause the apparatus to perform any method of method 200 or 300.

Figure 7:
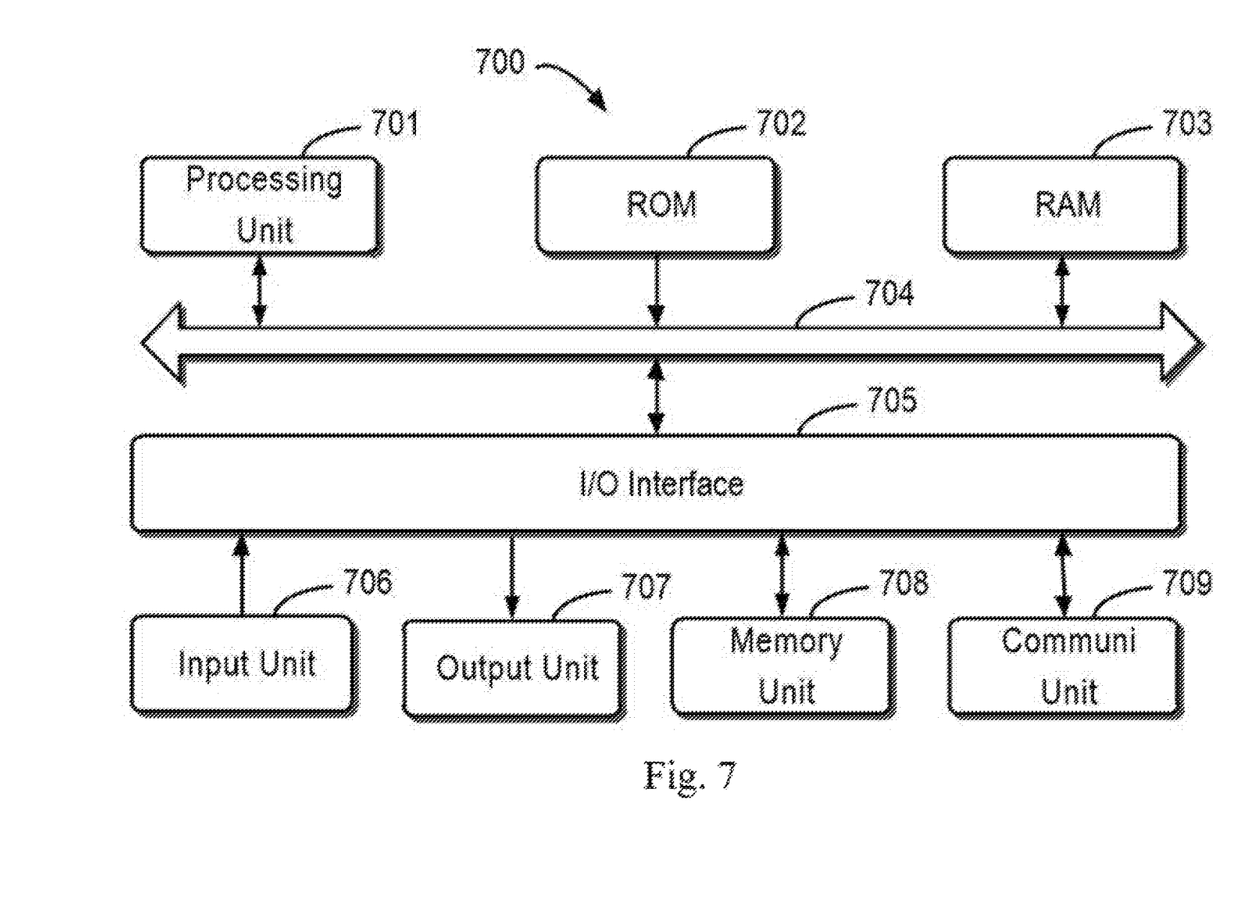
FIG. 7 illustrates a schematic block diagram of an apparatus that may be used to implement embodiments of the present disclosure.

FIG. 7 illustrates a schematic block diagram, of an apparatus 700 that may be used to implement the embodiments of the present disclosure. As illustrated in the figure, the apparatus 700 comprises a processing unit (for example, CPU, but not limited to) 701 which may perform various appropriate actions and processing according to the computer program instructions stored in a read-only memory (ROM) 702 or computer program instructions from a memory unit 708 (for example, the computer program instructions loaded in the random access memory (RAM) 703 from the memory unit 708). Various programs and data needed by operations of the memory device 700 may also be stored in RAM 703. The processing unit 701, ROM 702, and RAM 703 are connected with each other via a bus 704. The input/output (I/O) interface 705 is also connected to the bus 704.

A plurality of components in the apparatus 700 are connected to the I/O interface 705, comprising: an input unit 706, for example a keyboard, a mouse, etc.; an output unit 707, for example various types of displays and loudspeakers, etc.; a memory unit 708, for example a magnetic disc, an optical disc etc.; and a communication unit 709, for example a network card, a modem, and a radio communication transceiver etc. The communication unit 709 allows the apparatus 700 to exchange information/data with other devices via a computer network such as Internet and/or various telecommunication networks.

Various processes and processing described above, e.g., method 200 or 300, may be performed by the processing unit 701. For example, in some embodiments, the method 200 or 300 may be implemented as a computer software program that is tangibly embodied on the machine readable medium, e.g., the memory unit 708. In some embodiments, part or all of the computer program may be loaded and/or installed onto the apparatus 700 via ROM 702 and/or communication unit 709. When the computer program is loaded in the RAM 703 and executed by the processing unit 701, one or more operations of the method 200 or 300 as described above may be executed.

The functions of various elements of the apparatus illustrated in the accompanying drawings may be provided by software, specific hardware, and hardware associated with appropriate software and capable of executing software, or firmware, or a combination thereof. When provided by the processor, the function may be provided by a single specific processor, a single shared processor, or a plurality of individual processors. Besides, the term "processor" may include, but is not limited to, a digital signal processor (DSP) hardware, a network processor, an application-specific integrated circuit (ASIC), a field programmable gate array (FPGA), a read-only memory (ROM) for storing software, a random access memory (RAM) and a non-volatile storage device. It may also comprise other convention and/or customized hardware.

Those skilled in the art should understand that the specification and the drawings only illustrate a principle of embodiments of the present disclosure. Therefore, it should be understood that those skilled in the art can design various kinds of arrangements that, though not explicitly described or illustrated herein, embody the principle of the embodiments of the present disclosure and are included within the spirit and scope of the embodiments of the present disclosure. Besides, all examples illustrated herein are mainly intended explicitly for teaching purposes so as to help readers to understand the principle of the embodiments of the present disclosure and the concepts contributed by the inventors for advancing the field, while should not be interpreted as limiting to examples and conditions elaborated herein. Meanwhile, all the statements describing principles, aspects and embodiments of the present disclosure also intend to include also their equivalents.

We claim:

1. A method for use in a video surveillance system, comprising:
receiving a video data transmission request from a new mobile device that is not part of the video surveillance system;
in response to the video data transmission request, dynamically registering the mobile device that is not part of the video surveillance system as a new surveillance device of the video surveillance system;
establishing a wireless connection with the mobile device, receiving video data from the mobile device via the wireless connection; and
processing and storing the video data,
wherein the method further comprises, prior to receiving the video data transmission request from the mobile device, transmitting to the mobile device an invitation to join the video surveillance system, the invitation transmitted as part of a broadcast invitation sent to multiple crowd-owned mobile devices within a designated region.

2. The method according to claim 1, wherein the video surveillance system further comprises a fixed surveillance device.

3. The method according to claim 2, wherein the fixed surveillance device is part of the video surveillance system both before the mobile device joins the video surveillance system and after the mobile device exits the video surveillance system.

4. The method according to claim 3, wherein the mobile device is a crowd-owned mobile device that is not a permanent part of the video surveillance system.

5. The method according to claim 1, wherein establishing a wireless connection with the mobile device comprises:
assigning a video server for processing the video transmission request; and
establishing the wireless connection with the mobile device via the video server.

6. The method according to claim 1, further comprising:
monitoring usage of resources in the video surveillance system; and
adjusting, based on the monitoring, resource amount allocated for the video surveillance system.

7. The method according to claim 1, further comprising:
upon interruption of the wireless connection with the mobile device, saving a break point to facilitate recovering the wireless connection from the break point.

8. The method according to claim 1, further comprising:
receiving, from the mobile device and via the wireless connection, a result of pre-processing of the video data; and
wherein the processing and storing the video data comprises:
processing and storing the video data and the result of the pre-processing.

9. The method according to claim 8, wherein the result of pre-processing for the video data includes at least one of the following:
- video frame,
- metadata,
- at least one of type, configuration, and model of the mobile device,
- at least one of capturing time and location of the video contained in the video data, and
- at least one of a content feature and an object of the video data.

10. The method according to claim 8, wherein processing and storing the video data and the result of pre-processing comprises:
- processing and storing the video data and the result of the pre-processing, respectively.

11. The method according to claim 10, wherein processing and storing the video data and the result of pre-processing, respectively, comprises:
- performing data staging of the video data;
- processing and storing the data staged video data; and
- processing and storing the result of the pre-processing without the data staging.

12. The method of claim 1, wherein the wireless connection is bi-directional, and wherein the method further comprises, in response to abnormality being detected in processing the video data, transmitting an alarm to the mobile device via the wireless connection, the alarm enabling the mobile device to alert a user of the mobile device that the abnormality was detected.

13. A computer program product including a set of non-transitory, computer-readable media having instructions which, when executed by a set of processors of a video surveillance system, cause the video surveillance system to perform a method, comprising:
- receiving a video data transmission request from a new mobile device that is not part of the video surveillance system;
- in response to the video data transmission request, dynamically registering the mobile device that is not part of the video surveillance system as a new surveillance device of the video surveillance system;
- establishing a wireless connection with the mobile device, receiving video data from the mobile device via the wireless connection; and
- processing and storing the video data,
- wherein the method further comprises, prior to receiving the video data transmission request from the mobile device, transmitting to the mobile device an invitation to join the video surveillance system, the invitation transmitted as part of a broadcast invitation sent to multiple crowd-owned mobile devices within a designated region.

14. A video surveillance system, comprising a processing unit coupled to memory, the video surveillance system constructed and arranged to:
- receive a video data transmission request from a new mobile device that is not part of the video surveillance system;
- in response to the video data transmission request, dynamically register the mobile device that is not part of the video surveillance system as a new surveillance device of the video surveillance system;
- establish a wireless connection with the mobile device, receive video data from the mobile device via the wireless connection; and
- process and store the video data,
- wherein the video surveillance system is constructed and arranged to, prior to receipt of the video data transmission request from the mobile device, transmit to the mobile device an invitation to join the video surveillance system, the invitation transmitted as part of a broadcast invitation sent to multiple crowd-owned mobile devices within a designated region.

15. The video surveillance system according to claim 14, wherein the video surveillance system further comprises a fixed surveillance device.

16. The video surveillance system according to claim 15, wherein the mobile device is a crowd-owned mobile device that is not a permanent part of the video surveillance system, and wherein the fixed surveillance device is part of the video surveillance system both before the mobile device joins the video surveillance system and after the mobile device exits the video surveillance system.

* * * * *